Aug. 20, 1968     H. M. BERRY     3,397,939

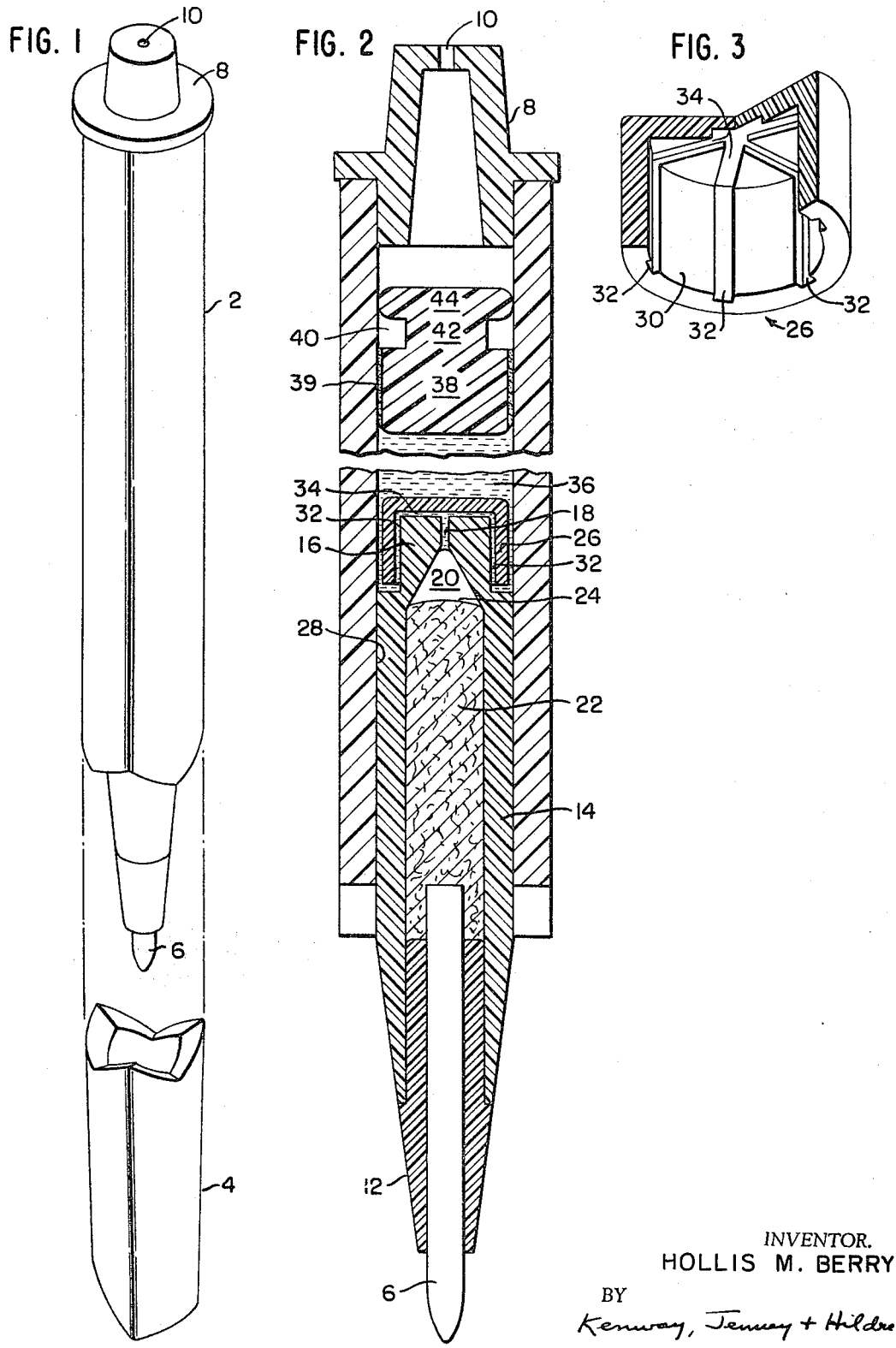

MARKING INSTRUMENT

Filed Sept. 14, 1966     2 Sheets-Sheet 2

INVENTOR.

HOLLIS M. BERRY

BY Kenway, Jenney + Hildreth

ATTORNEYS

United States Patent Office 3,397,939
Patented Aug. 20, 1968

3,397,939
MARKING INSTRUMENT
Hollis M. Berry, Lakeville, Mass., assignor to The Carter's Ink Company, Cambridge, Mass., a corporation of Massachusetts
Filed Sept. 14, 1966, Ser. No. 579,388
10 Claims. (Cl. 401—198)

ABSTRACT OF THE DISCLOSURE

The invention is a marking instrument of the type having a porous nib, the inner end of which contacts a porous ink-saturated filler in the barrel of the writing instrument. A metering valve is provided in the barrel between a reservoir of liquid ink and the filler for measuring and controlling the flow of liquid ink to the filler. The metering valve is a molded structure so shaped that a volume of air is trapped in the valve at atmospheric pressure to create a balanced fluid system, resulting in an air check offsetting the hydrostatic pressure of the ink in the filler and reducing the flow of ink through the valve to zero. Flow of ink from the writing tip, when in use, permits the entrapped air to expand into the filter, thus dropping its pressure and permitting flow of ink through the passageway to the filler to replenish the latter's absorbed ink supply.

This invention relates to marking instruments or pens, and particularly to the type that uses a porous nib and a porous ink-saturated filter in the barrel of the writing instrument.

Briefly, the invention comprises an improved writing implement of the above class, in which a metering means is provided for measuring and controlling the flow of ink, from a supply thereof in the barrel of the pen, to the porous filler, ink being permitted to flow in a controlled manner to the porous filler as the latter becomes partially depleted of ink, the flow of ink from the supply to the filler being metered automatically, and the ink being supplied in such manner that air in the filler is not entrapped to cause malfunctioning.

In marking instruments of the general class considered here, one of the problems has been that when replenishing means are supplied in the pen for feeding ink to the wick or filler thereof, no automatic means are used to meter the amount of ink that flows into the filler. The result is that either too little ink flows and the nib becomes too dry; or too much supply ink flows into the filter and the nib of the pen becomes too wet, so much so that unwanted ink may leak from the nib.

Also, if in providing a flow of ink to the filler of such marking instruments, the replenishing ink is permitted to drop on the inner end of the filler, then as it does so, it teds to "trap" air in the interstices of the filler, which air progresses along the filler to the nib. The nib then becomes too dry to write properly. Further difficulty with many of the presently available pens or writing instruments of the class being considered is that means are generally not provided for determining the amount of fresh ink that should be permitted to flow into the filler of the pen for replenishment, this being left somewhat to guesswork. As a result, either too much ink or too little ink may be supplied.

It is the general purpose of this invention, therefore, to overcome the above stated problems in a writing instrument in which a fresh supply of ink is supplied to the filler of the pen automatically as such ink is needed, and in the correct amount, while avoiding the trapping of air in the filler, and avoiding either a too dry a filler or a too wet a filler.

Therefore, among the several objects and advantages of the invention may be noted the following: the provision of a marking instrument of the general class referred to, in which means are provided for automatically regulating the flow of ink from a supply thereof to the wick or filler of the writing instrument; the provision of a writing instrument of the above class in which metering means are provided for determining, in conjunction with the filler iself, the amount of ink that will be permitted to flow into the filler; the provision of a writing instrument of either of the above classes in which means are provided for preventing the trapping of air in the filler; the provision of marking instruments of any of the above classes in which means are provided for preventing the leakage of ink from the pen, regardless of the position in which it is held; the provision of a writing instrument of any of the above classes in which the amount that is supplied to the filler and thus to the nib of the instrument is controlled according to the rate of usage of ink from the nib of the instrument; the provision of a writing instrument with a large ink supply that will meter ink automatically on demand; the provision of a writing instrument with a full charge of ink in its chamber that can be shipped or carried in any position, and as to which the ink supply does not have to be carried or shipped separately; a writing instrument with a capillary and feed system usable in any position; and the provision of writing instruments of the above kinds which are simple and economical to make and relatively fool-proof in operation. Other objects and advantages will be in part apparent and in part point out hereinafter.

The invention accordingly comprises the elements and combinations of elements, features of construction, and arrangement of parts which will be exemplified in the structures hereinafter described; and the scope of the application of which will be indicated in the appended claims.

In the accompanying drawings, in which several of the various possible embodiments of the invention are illustrated:

FIG. 1 is an illustration of one embodiment of this invention, given to show its general configuration;

FIG. 2 is a sectional elevation of the embodiment of FIG. 1, the illustration being enlarged over that shown in FIG. 1, and a central portion being omitted for convenience of illustration;

FIG. 3 shows a sectional illustration of an operating part of the FIG. 2 embodiment;

Throughout the drawings, similar reference characters indicate corresponding parts, and the dimensions of certain of the parts as shown in the drawings may have been modified and/or exaggerated for the purposes of clarity of illustration.

Figure 4:
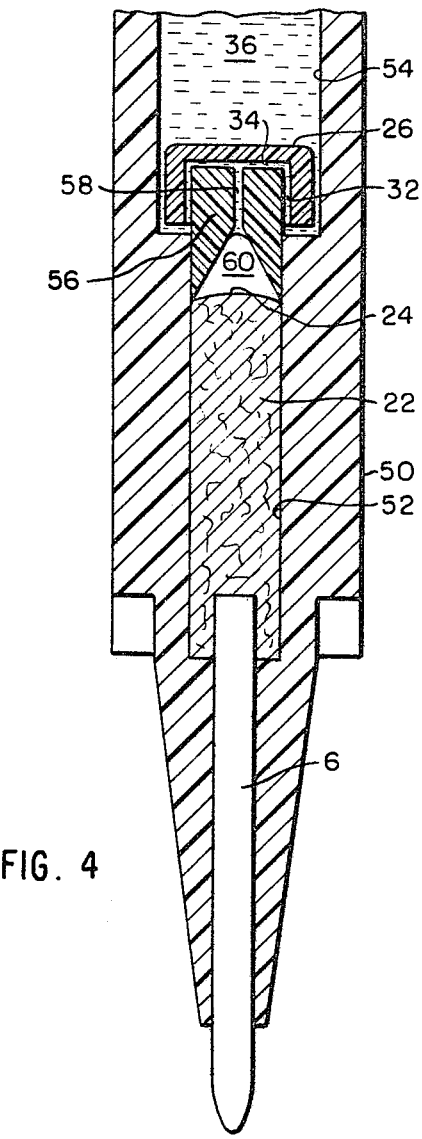
FIG. 4 shows an elevation, in section, of a portion of a second embodiment of the invention.

Referring first to FIG. 1, there is shown a typical external shape or configuration of a writing instrument of this invention comprising a body 2 and a cap 4. Body 2 is a tube and has projecting from one end thereof the nib 6, the latter being made of porous material capable, by capillary action, of drawing ink from the interior of body 2 to the point of the nib for writing or marking purposes. The cap 4 is hollow and, in conventional manner, has a closed end and a vent hole (not shown), the cap fitting tightly over the nib holder when the cap is placed on the body 2. The upper end of body 2 is closed by a cap 8, the latter being provided with an orifice 10 to permit air to enter the upper (as viewed) portion of the body 2.

Body 2, cap 4 and cap 8 may conveniently be made of molded plastic, as is conventional. The cap 8 may, if desired, be sealed by suitable cement, or welded, to the end of the body 2, or may be made a snap or press fit.

Referring now to FIG. 2, for details of construction, the nib 6 is held in the nib holder 12 which fits tightly in the tubular filler-holder 14. As shown, the inner end of the nib 4 projects above the holder 12 into the interior of the tubular holder 14.

Holder 14 secured and sealed into the lower section of the body 2, and at its upper end is closed by end 16 which forms, in this embodiment, part of the metering section of the writing instrument. End 16 is formed as a neck having a smaller diameter than the diameter of the bore 28 of body 2, and is provided with a passageway 18. The lower end of the passageway terminates at the apex of a generally conically-shaped recess 20 in the neck 16, the function of which will be described below. A filler of porous material 22 is held in the holder 14 with the upper end of nib 4 projecting therein as shown, and the innermost end 24 being positioned at the point where the base of the cone-shaped recess merges with the wall of the holder 14. With this construction, it is clear that the cone-shaped recess 20 is bounded at the top by the inner end of the passageway 18 and at the bottom or base by the upper end of the filler 22.

A metering cap 26 (see FIG. 3) is mounted on the neck 16 and is held thereon either by the use of suitable adhesives, or by being a press fit. The exterior diameter of cap 26 is less than the diameter of the bore 28 of the tube 2, and thus the exterior wall of the cap forms, in conjunction with the wall of bore 28, a peripheral space or channel. The interior wall 30 of cap 26 is provided with a plurality of grooves 32, and the inner surface of the end of the cap is likewise provided with grooves 34. The inner ends of grooves 32 and 34 join as shown, thus providing passageways along the grooves to the approximate center of the end of the cap. The overall length of the cap 26 is less than the length of the neck 16. Thus, when the cap is placed in position on the neck 16 with the face having grooves 32–34 in contact with the end of neck 16, there will be a continuous passageway from the top of the cap (as viewed) down the peripheral space described above, around the (bottom) rim of the cap, up the grooves 32, along the grooves 34, and thus to the passageway 18. The total volume of the grooves 32 and 34 can be equal to the total volume of the passageway 18.

In the several embodiments, a plurality of grooves is shown, but one or more may be used, depending on the viscosity of the ink and its surface tension. The greater the viscosity, the larger the number and/or size of the grooves; and experience has shown that within the range of viscosities and surface tensions of inks commonly used, the number of grooves will run from one to six.

Above the cap 26 there is provided a supply of ink 36. Above the supply of ink is provided a sealing means, which in this instance is a plug 38 (preferably of plastic compatible with the ink). Plug 38 is slidable in the bore 28 and has a layer of grease or some other ink repellent material between the periphery of the plug and the bore 28. Plug 38 prevents backward leakage of the ink. A further supply of sealing grease, or possibly a rubber or neoprene sealing ring may be placed in the space 40 provided by the neck 42 and flange 44 construction of the plug. Plug 38 is made slidable in the bore 28 so that as the supply of ink 36 diminishes, the plug will follow the ink because air at atmospheric pressure is admitted through the orifice 10 to the back end of the plug.

The assembly of this embodiment will now be described: the nib 6 is inserted in nib-holder 12, filler 22 is positioned in holder 14, the nib-holder (with its nib) is inserted in holder 14, and then this entire assembly is inserted in bore 28. The above assembly is completely saturated with ink. Cap 26 is placed on neck 16, and ink 36 is then placed in the upper or reservoir section of the tube 2. Plug 38 is inserted on top of the ink supply, and cap 8 then is mounted at the upper end of tube 2.

The operation of the pen is as follows: in general, after the nib and filler are saturated and there is ink 36 in the reservoir, air is trapped at atmospheric pressure in the valving passage 18 and the air chamber created by the recess 20 and the end 24 of the filler. This creates a balanced fluid system creating an air check offsetting the hydrostatic pressure of ink 36 and reducing the flow of ink through passageway 18 to zero.

Flow of ink from the writing tip, when in use, creates a partial desaturation of the writing tip and filler material by capillary action. Desaturation occurs at the upper end (as viewed in FIG. 2) of the filler, and air in the chamber 20 can then expand into the upper end of the filler. As it does so, its pressure drops, and this drops the pressure on the ink in passageway 18. This condition changes the system from a balanced one to an unbalanced one, and ink can now flow through passageway 18.

However, because of the fact that the inner end of passageway 18 terminates at the apex of the conical walls of chamber 20, the ink flows down the walls of the chamber to the point where the upper end of the filler meets the base of the recess 20. At this point, capillary action at the interface between the periphery of the filler and the bore of the filler holder 14 will cause the ink to travel downwardly along the interface to the point that it meets ink already remaining in the filler 22. The replenishing ink will then flow inwardly to the center portions of the filler 22. As a result of this forced conduction of ink along the walls of the chamber 20 and down between the filler and its holder, no air is entrapped by the replenishing ink in the filler.

Thus, the desaturated sections of the filler are again saturated with ink. As re-saturation takes place, the air is forced out of the upper end 24 and into the chamber 20. This increases the pressure in the chamber and stops the flow of ink from the passageway 18. Thus, the metering action of the metering section of the writing instrument is automatic. Ink is permitted to flow when it is suitable for it to flow (that is, the filler 22 is becoming partially depleted of ink), and is then stopped when the filler again becomes saturated with ink.

A further purpose of providing the relatively small grooves 32 and 34 and passageway 18 is to minimize the effect of change in the hydrostatic head of the ink supply 36 as the latter becomes diminished in use. By providing the narrow and extended channel lengths as shown, the effect of change of the supply ink level on the rate of flow of ink through the several passageways, is minimized.

In the device as described, it will be noted that basically the tube 2 is in two sections, an upper portion which contains the supply of ink, the plug 38, and the orifice 10; and a lower portion which contains the filler 22 and the nib 4. Between these two portions is the metering and valving section which in this embodiment comprises the neck 16, passageway 18, and cap 26 with its grooves 32 and 34; the peripheral space between the outer walls of the cap and the bore 28; and the chamber 20.

Satisfactory operation of the marking instrument has been obtained using the following exemplary dimensions, which are approximate:

| | | |
|---|---|---|
| Diameter of bore of filler holder 14 | inches | 0.187 |
| Taper of wall of chamber 20 (included angle) | deg | 60 |
| Diameter of passageway 18 | inches | 0.032 |
| Length of passageway 18 | do | 0.032 |
| Outside diameter of neck 16 | do | 0.187 |
| Inside length of cap 26 | do | 0.150 |
| Overall length of cap 26 | do | 0.219 |
| Outside diameter of cap 26 | do | 0.265 |
| Diameter of bore 28 | do | 0.285 |
| Width of grooves 30–32 | do | 0.015 |
| Depth of grooves 30–32 | do | 0.002 |
| Number of grooves | | 4 |
| Surface tension of ink (dynes per centimeter) | | 30 |
| Viscosity of ink | millipoises | 10–15 |

As indicated above, the values given are approximate and may be varied within reason. As to viscosity and surface tension of the ink, there is almost an infinite number of viscosities and surface tensions that may be used. It would serve no purpose to list herein numerous examples of such inks, since to the man skilled in the art, the proper selection of the ink used will be within his skill, in view of the teaching of this invention.

Referring now to FIG. 4, for a second embodiment of the invention, the nib 6 and filler 22 are provided as in the first embodiment. However, in this instance a portion of the metering section has been changed, and the interior configuration of the main body of the pen has been changed as follows:

The body 50 of the pen has a bore 52 in its lower section which is smaller in diameter than the bore 54 of the upper section, a shoulder being provided (as shown) where the bores meet. The filler 22 is placed directly in bore 52 and has an upper end 24 terminating as shown.

A metering cap 26 is provided as in the FIG. 1 embodiment, being provided with the grooves 32 and 34 like those in the first embodiment. Cap 26 fits snugly over a metering plug element 56 which is provided with the conical air chamber recess 60. A passageway 58 is provided in plug 56, the inner end of the passageway terminating at the apex of the chamber 60. The base of the plug 56, and thus the base of the recess 60, terminates just above the top 24 of filler 22. The element 56 is made either as a tight press fit in the bore 52, or may be sealed therein by using a suitable adhesive. An ink supply 36 is provided in bore 54 and, as in the FIG. 1 embodiment, above the ink supply is placed a follower and sealing means 38 (not shown in this drawing), as was provided in the first embodiment.

The operation of this embodiment is the same as that of the first embodiment, the metering passageways for ink being provided by the peripheral space between the outer wall of the cap 26 and the upper bore 54, the grooves 32 and grooves 34 and the passageway 58 providing for flow of ink from the supply 36 thereof to the air chamber 60. When the upper portion of filler 22 becomes desaturated because of ink having been drawn therefrom by the nib 6, air pressure in the chamber 60 is reduced, thus permitting ink to flow from exit end of passageway 58, down the walls of the cone-shaped recess which provides the chamber 60, and to the desaturated portions of the filler 22 as in the first embodiment.

In this embodiment, as in the first embodiment, a suitable cap may be employed to protect the nib 6 when the writing instrument is not being used.

Figure 5:
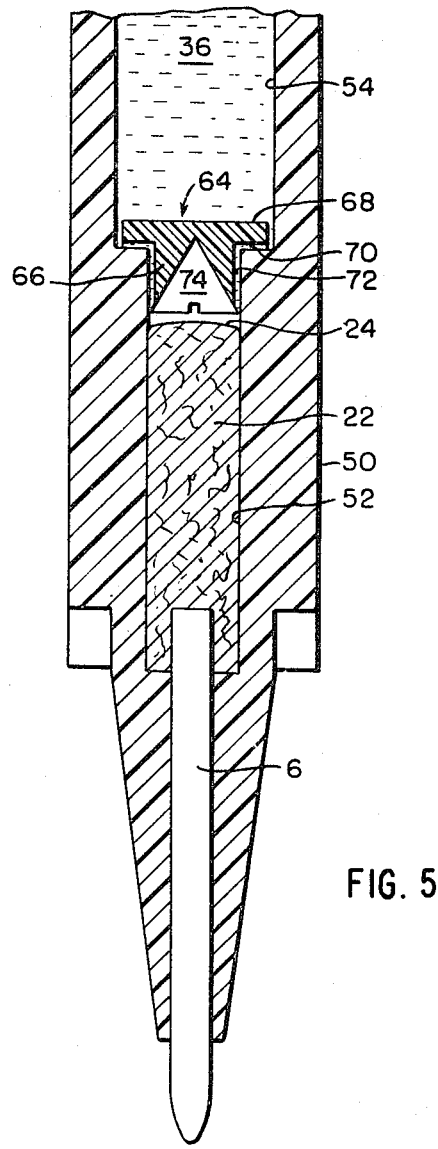
FIG. 5 shows an elevation, in section, of a portion of a third embodiment of the invention.
Figure 6:
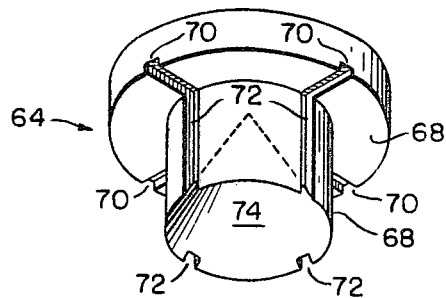
FIG. 6 is an illustration of an operating element of the FIG. 5 embodiment.

Referring now to FIG. 5, a third embodiment of the invention is shown, and in this instance the same body 50 is provided as in the FIG. 4 embodiment, with the filler 22, and nib 6, and bores 52 and 54. However, in this embodiment, a different construction of the metering section is provided as follows:

Referring to FIG. 6, a metering element 64 is shown having a body portion 66 and a radially extending flange portion 68. The underneath surface of the flange 68 is provided with the plurality of grooves 70, these connecting with the grooves 72 which are provided along the peripheral surface of element 66. Element 66 is provided with the generally cone-shaped recess 74 which provides an air chamber similar to inner chambers 20 and 60. The diameter of the flange 68 is made less than the bore 54, and the diameter of the body 66 is made such that it will be a press fit into the bore 52. If desired, metering element 64 may be cemented into bore 52 by a suitable adhesive. Element 64 is inserted far enough into the bore 52 so that the underneath surface of flange 68 rests against the shoulder provided between the bore 52 and bore 54.

Again as in the first two embodiments, metering passageways are provided for the flow of ink 36 to the desaturated portions of the filler 22, these metering passageways in this embodiment comprising the peripheral space between the outer periphery of the flange 68 and the bore 54, the grooves 70, and grooves 72. However, in this instance, it will be noted that the inner end of the element 64 ends short of the upper surface 24 of the filler, and thus there will be a short section of the wall of bore 52 between the inner ends of grooves 72 and the inner end 24 of the filler. The air chamber in this instance therefore comprises the cone-shaped recess 74 plus a small section of bore 52 above the end 24 of filler 22.

When the filler 22 is saturated with ink, the pressure in the air chamber (consisting of the cone-shaped recess 74 and that portion of the bore 52 lying above the end 24 of the filler) will be sufficient to prevent the flow of ink through the above identified passageways into the upper end of the filler. However, when the upper end of the filler becomes desaturated, then the air pressure is reduced, as described for the first two embodiments, and the drop in pressure flow of ink from the orifices of the grooves 72 down the short portion of the bore 52 and into the interface between the desaturated portions of the upper end of the filler 22 and the wall of bore 52. As a result of this, the desaturated portions will become saturated again, with resulting increase in the air pressure in the air chamber to stop the flow of ink.

In all embodiments, the chamber 74 has been shown as generally of conical shape. However, other shapes can be used provided they are such that in conjunction with the location of the exit orifices of the passageways, the effect of the air chamber configuration is to force supply ink to travel down the walls of the chamber to the said interfaces.

If this provision is not made, then a drop of ink will gradually form (referring particularly to the first two embodiments) at the end of the passageways 18 and 58, and eventually the drop will fall from the end of the passageway directly onto the top surface 24 of the filler. Ink thus falling onto the top surface of the filler will gradually flow down through the filler, but as it does so, this top layer of ink with entrap a desaturated zone in the filler which will gradually travel down through the filler until it reaches the inner end of the nib 6. At this point, the nib will no longer have a source of ink, the nib will become desaturated, thus leading to non-functioning of the instrument. By providing means to have the ink flow down the walls of a portion of the bore (the third embodiment) or to flow down the walls of the cone-shaped recesses (first and second embodiments) to the interface between the upper end of filler 22 and the wall of the bore in which the filler lies, ink is caused to be taken by capillary action down this interface and then inwardly to saturate all of the desaturated portions of the filler without trapping air in the filler.

As indicated above, all parts of the pen are preferably made of plastic which is compatible with the ink used. Adhesives that are used should also be compatible with the inks used, and are well known in the art. The fillers 22 may be a fibrous or porous material such as, for example, wool, Dacron, nylon, cellulose acetate, or like material. The nib 6 may also be of compressed wool, Dacron, nylon, microporous plastic, or the like. Thus, the combination of the two materials creates a capillary system between the two materials when saturated with ink, and causes ink to flow from the filler down through the nib as the nib is used for marking purposes.

The writing instrument as shown indicates that a cylindrical interior is generally preferred, but interiors of other cross-sectional shapes may be used if desired. If such other cross-sectional shapes are used, then it is important that the filler 22 be inserted in such a way that no air voids are left except those that are within the filler itself and within the air chambers.

In conventional loose liquid ink instruments which utilize a two-way metering system, the ink supply must be limited to small quantities contained in a sealed cartridge. As the ink is consumed or used by the conventional capillary action, a vacuum is created in the sealed cartridge and this starves and reduces the ink flow in the capillaries, so that air must flow through the same channels in the reverse direction of ink flow to replenish the reduced pressure in the sealed cartridge in order to start the flow again.

Also, conventional cartridge systems that operate in the above manner are subject to leakage and dry out when exposed to environments created by elevated temperatures and reduced atmospheric conditions as encountered, for example, in aircraft, when the device is not in the conventional storage position, that is, with the writing tip uppermost. Such instruments are usually shipped and stored with the cartridges separated from the markers or writing instruments themselves. With the invention as described above, this condition does not exist because the ink supply which is larger in volume and is contained by a resilient follower will move to accept the expansion of ink due to elevated temperatures. Under reduced atmospheric conditions, the pressure does not have a differential on either end (since the cap for the pen has a vent hole), and therefore the instrument remains in balance (hydrostatically) regardless of its storage position.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description, or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A marking instrument comprising an elongated tube having first and second bore portions; a porous body of material located within said first portion; a nib mounted in said first portion and having one end projecting outwardly therefrom and the other end in contact with one end of the porous body; ink metering means mounted in the tube adjacent the other end of the porous body, the metering means having a portion thereof extending across the bore of the tube and being provided with a passageway for the flow of ink, one end of the passageway being spaced from said other end of the porous body to leave an air chamber therebetween, and the other end of the passageway opening into said second bore portion; a supply of ink in said second bore portion, the ink being adapted to flow from the second portion to the first portion through the passageway; and sealing means mounted in said second portion for preventing back flow of the ink, the sealing means having a front surface in contact with the ink and a back surface exposed to atmospheric pressure; whereby ink flows through the passageway to saturate the plug until the air pressure in said chamber prevents further flow of ink through the orifice, flow being reestablished when said air pressure is reduced.

2. A marking instrument comprising:
   an elongated tube having first and second bore portions;
   a porous body of material located within the first bore portion and having outer and inner ends;
   a porous nib mounted at the end of the first bore portion and having one projecting outwardly therefrom and the other end in contact with the outer end of the porous body;
   ink metering means mounted in the tube adjacent the inner end of the porous body, the metering means comprising a body portion engaging the wall of the first bore portion, and an end portion having a periphery lying adjacent but closely spaced apart from the wall of the second bore portion to provide a peripheral first passageway for the flow of ink; said body portion being provided with a cone-shaped recess the base of which lies adjacent the inner end of the porous body, whereby an air chamber is provided adjacent said inner end, and said body portion being provided with at least one second passageway for the flow of ink, one end thereof communicating with said air chamber, and the other end communicating with said peripheral space;
   a supply of ink in said second bore portion and adapted to flow through said peripheral space and said passageway; and
   sealing means in said second bore portion for preventing back-flow of the ink, the sealing means having a front surface in contact with the ink and a back surface subject to atmospheric pressure.

3. The instrument of claim 2 in which the end portion of the metering means comprises a cap whose wall fits around the end of the body portion of the metering means, at least a portion of the outer surface of the cap being less in diameter than the diameter of said second bore portion, and the inside surfaces of the cap being provided with communicating grooves; and said second passageway extending from the apex of the cone-shaped recess to at least one of said grooves, thereby providing a continuous passageway for the flow of ink from the supply thereof along the said peripheral first passageway and through the grooves and second passageway to said air chamber.

4. The instrument of claim 2 in which the body portion and end portion of the metering means form a unitary structure, the end portion being a radially extending flange, the surface of the body portion being provided with at least one longitudinally extending groove, and the adjacent surface of the flange being provided with a groove therein connecting with the groove in the surface of the body, whereby the grooves form a continuous passageway for ink from the supply thereof to said air chamber.

5. The instrument of claim 2 in which the sealing means comprises a plug movable in the second bore portion with a layer of ink-resisting grease-like material between the periphery of the plug and the wall of the second bore portion.

6. A marking instrument comprising an elongated first tubular member; a second tubular member fitting tightly into the first member at one end thereof, a first portion of the second member extending outwardly from the first member and a second portion thereof extending inwardly of the first member; a porous nib mounted in said first portion, the outer end of the nib extending outwardly and the inner end extending into the bore of said second portion; a porous body of material positioned in the bore of said second portion and engaging the inner end of the nib; a hollow neck-portion closing the innermost end of said second member, the neck portion being provided with a passageway extending through the end wall thereof and having one end communicating with the interior of the second member and the other end communicating with the interior of the first member, the interior wall of the neck portion defining a generally cone-shaped air chamber with said passageway at the apex thereof, said porous body having its innermost end located at the base of the air chamber; a cup-shaped cap fitting over said neck portion and having an outer diameter less than the inner diameter of said first member to define a peripheral space therebetween, the inner wall and face of the cup-shaped member being provided with connecting grooves which communicate with said passageway whereby ink may flow through said peripheral space and along said grooves and passageway to the air chamber; a supply of ink in the first member adjacent the outer face of said cup-shaped member; a follower slidably positioned in the first member with one face adjacent the body of ink and the other face open to atmospheric pressure; and sealing means between the follower and the inner wall of the first member to prevent the flow of ink thereby.

7. In a marking instrument having a tubular body, a marking nib mounted in the body at one end thereof, a body of porous material in the body in contact with the inner end of the nib, and a supply of fluid ink in the body, that improvement which comprises automatically operating metering means between the supply of ink and the inner end of the body of porous material, the metering means comprising:

a hollow first part having an open end and a closed end, the interior of the part being of a general cone-shape, and the open end being positioned adjacent the inner end of the porous body to define an air chamber therebetween;

at least one passageway in said part between said air chamber and the outer face of the closed end of the part; and a second part juxaposed with said outer face and having at least one first groove therein communicating with the outer end of said passageway, the second part extending radially across the bore of the body with its periphery in close proximity with the wall of the bore to define a peripheral space therebetween, and said groove communicating with said peripheral space;

whereby ink from said supply is permitted to flow to the air chamber through the peripheral space, the groove, and the passageway, flow of the ink being controlled by the air-pressure in the air chamber.

8. The instrument of claim 7 in which said first and second parts form a unitary structure, the second part being a radially extending flange on the outer end of the first part, the passageway being a groove formed in the outer wall of the first part, and the first groove being formed in the underneath surface of the flange.

9. The instrument of claim 7 in which the second part comprises a cup-shaped member fitting over the end of the first part; the passageway extends from the apex of the cone-shaped interior of the first part; said first groove lies in the inner wall of the cup-shaped member and in the inner end face of the latter with the end of the groove overlying the outer end of said passageway; and the outer wall of the cup-shaped lies in close proximity to the wall of the bore.

10. In a marking instrument having a tubular body having a bore, a marking nib mounted in the body at one end thereof, a filler of porous material in the bore and having an outer end in contact with the inner end of the nib, and an inner end remote from its outer end, and a supply of fluid ink in the body, that improvement which consists of metering means adjacent said inner end of the filler controlling and directing the flow of ink from said supply to the said inner end of the filler the metering means comprising:

means establishing an elongated restricted pasaageway from the supply of ink to an orifice;

means establishing an air chamber, into which the orifice opens, above said inner end of said filler; and means for conducting ink from said orifice along a surface of the means establishing the air chamber to the interface between said inner end of the filler and the wall of the bore in which said filler is located.

References Cited

UNITED STATES PATENTS

| | | | |
|---|---|---|---|
| 3,003,183 | 10/1961 | Rosenthal | 401—206 |
| 3,074,380 | 1/1963 | Polishuk | 401—141 |
| 3,113,336 | 10/1963 | Langnickel | 401—206 |
| 3,153,804 | 10/1964 | Silver | 401—206 |
| 3,340,560 | 9/1967 | Nakata | 401—198 |
| 3,355,239 | 11/1967 | Albrecht | 401—198 |

FOREIGN PATENTS

| | | |
|---|---|---|
| 1,063,019 | 12/1953 | France. |
| 741,622 | 11/1943 | Germany. |

LAWRENCE CHARLES, *Primary Examiner.*